United States Patent [19]
Rothrock

[11] 3,764,037
[45] Oct. 9, 1973

[54] CLOSURE SEALING MEANS FOR PRESSURE VESSELS AND METHOD

[75] Inventor: Elmer Weyman Rothrock, Hinsdale, Ill.

[73] Assignee: Chicago Bridge & Iron Company, Oak Brook, Ill.

[22] Filed: July 2, 1971

[21] Appl. No.: 159,421

[52] U.S. Cl. ............... 220/46 P, 285/97, 277/34.3
[51] Int. Cl. ............................................ B65d 53/00
[58] Field of Search .................... 220/46 P; 285/96, 285/97, 109; 277/34.3

[56] References Cited
UNITED STATES PATENTS

| | | | |
|---|---|---|---|
| 2,691,460 | 10/1954 | Barnebey | 220/46 P |
| 3,276,619 | 10/1966 | Scholz | 220/46 P |
| 3,007,600 | 11/1961 | Horner | 220/46 P |
| 3,331,526 | 7/1967 | Levenson et al. | 220/46 P |
| 3,430,801 | 3/1969 | Homrig | 220/46 P |
| 3,514,115 | 5/1970 | Gallo | 220/46 P X |
| 2,822,192 | 2/1958 | Beatty | 285/97 |
| 3,057,646 | 10/1962 | Brumagim | 285/96 X |
| 3,695,637 | 10/1972 | Satterthwaite | 285/97 |

*Primary Examiner*—Allen N. Knowles
*Attorney*—Charles J. Merriam et al.

[57] ABSTRACT

A hollow metal expansion ring having an outer peripheral surface with spaced apart sealing means thereon adapted to pressure seal with a peripheral joint of two members, such as a vessel and cover therefor, positioned therearound with the interface of the joint located between the spaced apart sealing means. A conduit communicates with the ring interior for supplying a fluid thereto and another conduit withdraws the fluid. Sealing is effected by circulating a hot fluid through the ring to cause it to expand. The ring is released from sealing engagement by circulating a cold fluid through the ring to shrink it.

12 Claims, 5 Drawing Figures

Patented Oct. 9, 1973

INVENTOR
Elmer Weyman Rothrock
BY Merriam, Marshall, Shapiro & Klose
ATTORNEYS

INVENTOR
Elmer Weyman Rothrock
BY Merriam, Marshall, Shapiro & Klose
ATTORNEYS

CLOSURE SEALING MEANS FOR PRESSURE VESSELS AND METHOD

This invention relates to joint structures in which at least two members are releasably secured and sealed together to prevent leakage through a common interface or joint under high pressures and/or high temperatures from a space surrounded or enclosed by the two members. The invention is particularly applicable to joining structures where the joint is designed for fast coupling and uncoupling, often referred to as a quick opening closure.

In many commercial as well as experimental processing operations, it is necessary to join together two members by a sealing means which prevents the escape of gases or vapors under pressure through the joint. In addition to withstanding high pressures, the joint must often be able to withstand relatively high temperatures. The formation of joint structures suitable for such conditions is compounded by a need to have such joints periodically opened and resealed. Accordingly, to completely satisfy the requirements, the joint structure must not only be able to prevent leakage under the high pressure, and perhaps high temperature, to which it is subjected but must also be one which can be opened and closed quickly by suitable means.

Various joint structures of different types are presently used in processing vessels which employ high pressures and temperatures. Such vessels generally contain a walled body having an opening which is closed by a head or cover. The opening in the vessel normally has a rim or flange structure which mates or nests with an opposing face on the head or cover. Since it is often essential that there be periodic access to the vessel interior, the head or cover is releasably secured to the vessel. To prevent leakage at the interface between the cover and the vessel, various types of gaskets and sealing means are used. The presently used gaskets and sealing means require time consuming adjustment independent of, or in conjunction with, the coupling means. Where means for fast coupling and uncoupling of the joint is provided, the seal should also be capable of sealing without time consuming adjustment.

Inflatable seals are sometimes used. These are composed of a hollow rubber-like material and effect a seal, when they are expanded internally by a gas under pressure, against the sealing surfaces of the joint elements. Such seals, however, have limited use since they are not suitable for vessel service at high pressures and temperatures.

There is accordingly a clear need for a joint structure, and apparatus useful therein, which is capable of adequately and quickly sealing two members together at a joint thereof and which is suitable for high pressure and high temperature operations.

There is provided, according to one aspect of the invention, a novel hollow expansion ring for use in sealing two members together about a joint or common interface. By circulating a hot fluid through the ring it is caused to expand and seal the joint. By circulating a cold fluid through the ring it is caused to contract and release the seal. The invention also provides a method of sealing two members together by means of such an expansion ring and subsequently releasing them.

According to a further aspect of the invention, there is provided a joint structure comprising a first member having an opening defined by a rim with an inner peripheral surface, a second member having an inner peripheral surface, and a hollow expansion ring having an outer peripheral surface which is in close proximity to the said inner peripheral surfaces of the first and second members. Both the first member and the second member have end faces with mutually mating configurations positioned opposite each other in close proximity for releasably securing them together. The expansion ring is positioned and dimensioned to span the distance between the end faces of the first and second members. The expansion ring thus overlaps the interface defined by the opposing or abutting end faces of the two members.

Associated with the expansion ring is conduit means communicating with the expansion ring interior for circulating a cooling or heating fluid therethrough. The conduit means advisably comprises at least a first conduit for feeding a cooling or heating fluid to the expansion ring and a second conduit for removing the cooling or heating fluid from the expansion ring. The two conduits can extend through one of the members or, and preferably, the conduits can be positioned between the end faces of the two members so that unnecessary holes through the walls are avoided.

The invention will now be described further in conjunction with the attached drawings in which.

So far as is practical, the same elements or parts which appear in the different figures of the drawings will be identified by the same numbers.

Figure 1:
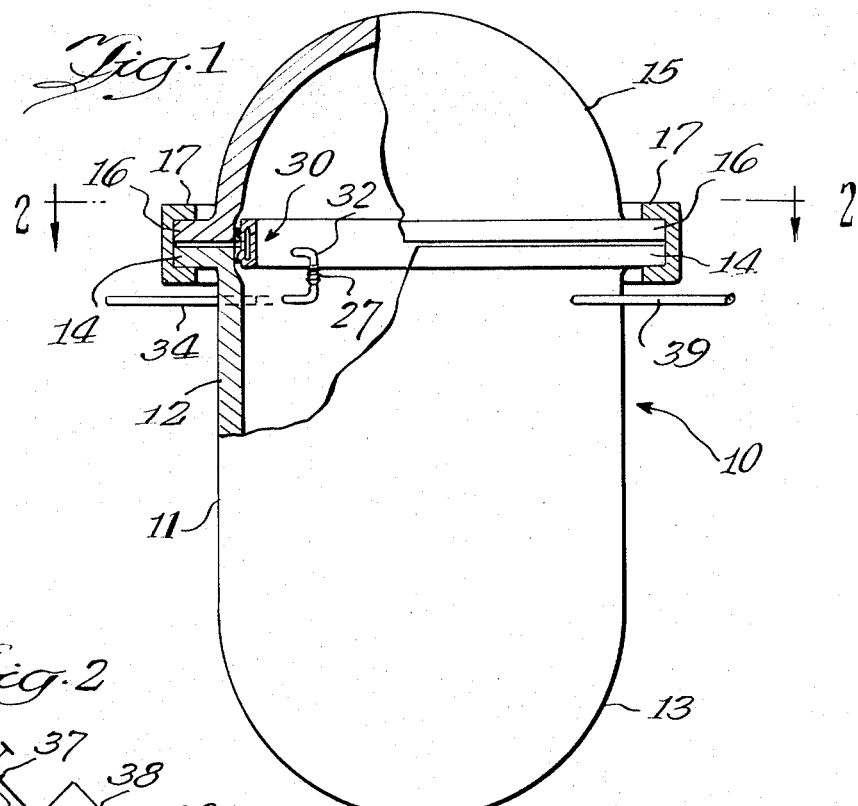
FIG. 1 is an elevational view, partially in section, of a vessel having a joint structure and hollow expansion ring according to the invention.
Figure 3:
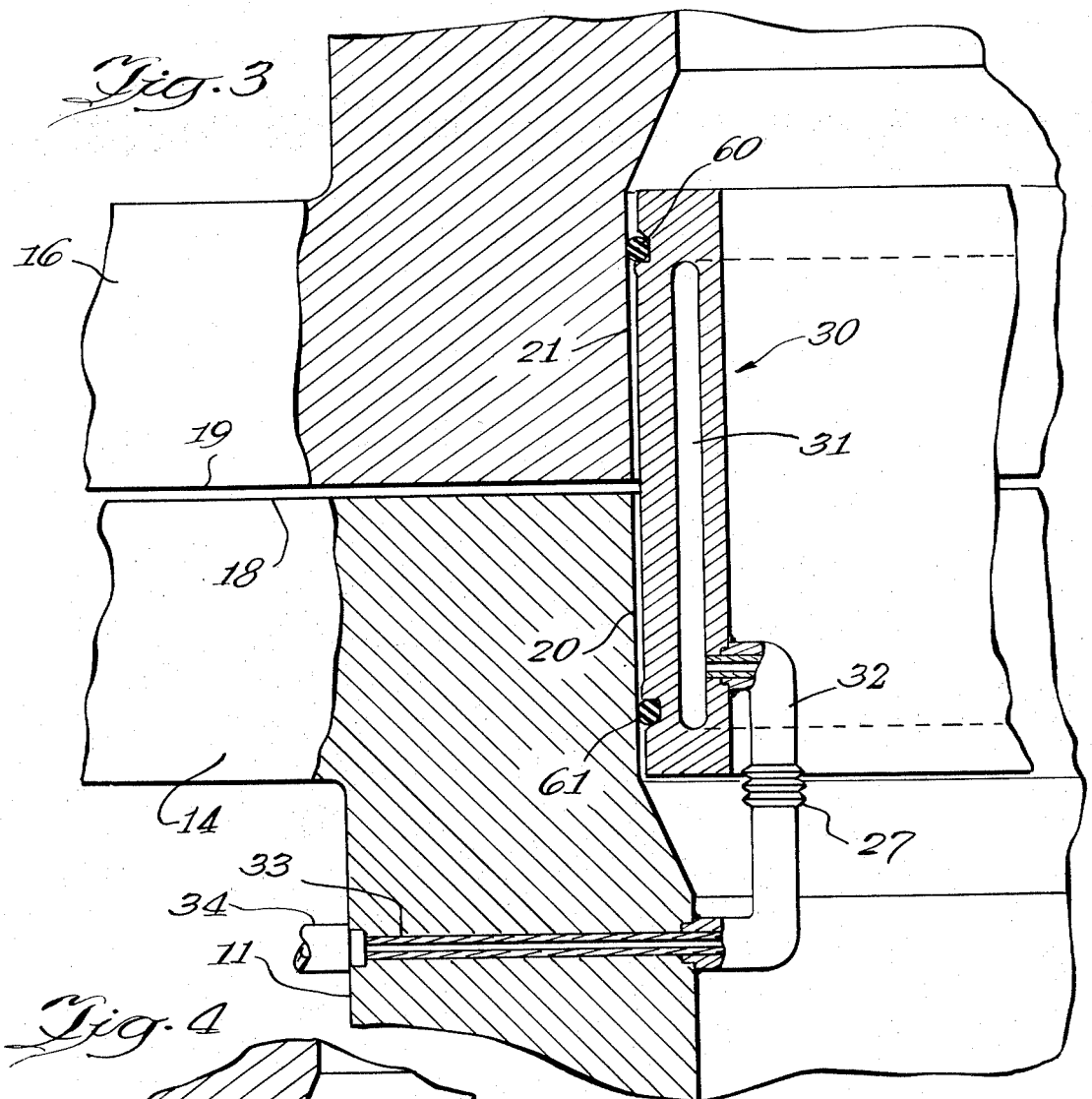
FIG. 3 is an enlarged vertical sectional view of the joint structure and hollow expansion ring shown in FIG. 1.

With reference to FIG. 1, vessel 10 has a vessel body 11 made of metal although it can be made of other suitable material. Vessel body 11 has an upper circular cylindrical section 12 and a lower semispherical portion 13. Flange or rim 14 is positioned at the top edge of the vessel body around the end thereof adapted to be opened. Vessel body 11 is shown closed at its upper end by cover or closure 15 which, as shown in FIG. 1, is hemispherical in shape. Flange or rim 16 is provided along the end of cover 15 to facilitate releasably securing the cover to the vessel body, such as by C-clamp 17 or other suitable conventional means, which permits quick coupling and uncoupling of the flanges 14 and 16. Each of flanges 14 and 16 has an end face which is essentially flat or planar as shown in FIG. 1, although such end faces can have other mutually mating configurations which permits them to be nested or placed together in abutting relationship to one another to facilitate their being releasably secured together. As shown in FIG. 3, end face 18 of the vessel body and end face 19 of the domed cover 15 are placed close together although they can be placed in abutting contact to each other if desired.

Figure 2:
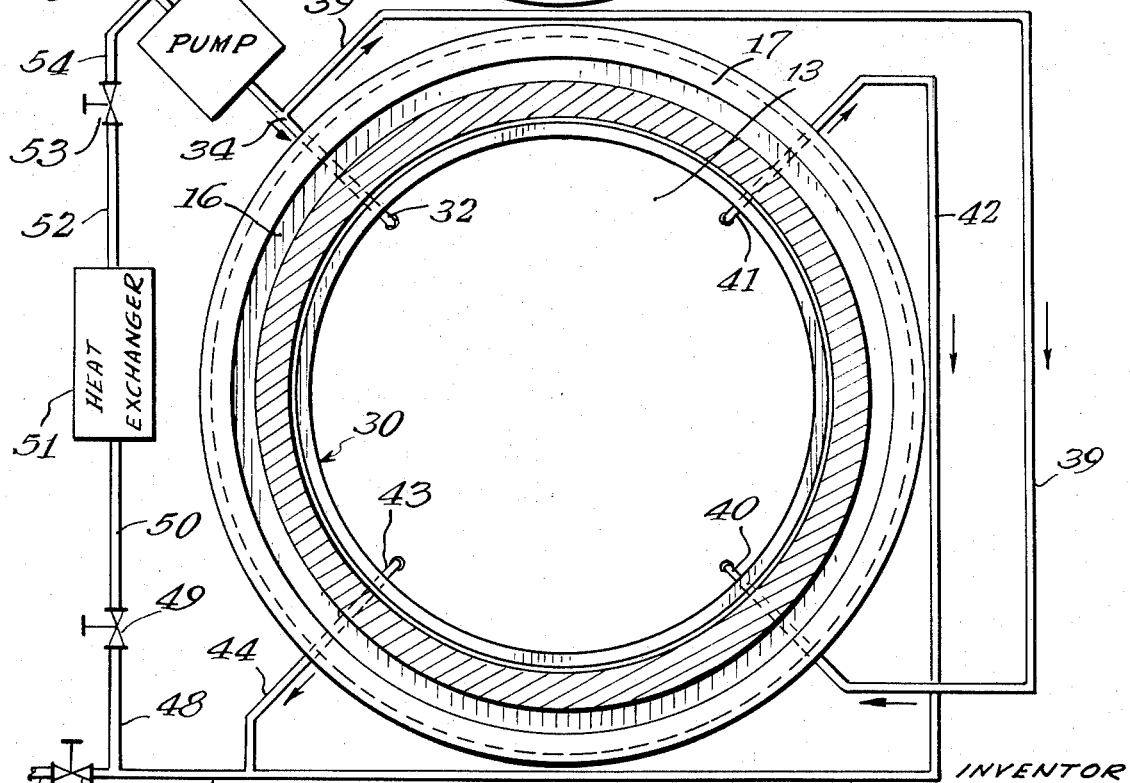
FIG. 2 is a sectional view taken along the line 2—2 of the vessel of FIG. 1.

The open end of vessel body 11 has an inner peripheral surface 20 and the cover 15 is similarly provided with an inner peripheral surface 21. The inner peripheral surfaces 20 and 21 as shown in FIGS. 1 to 3 are circular cylindrical surfaces. However, they can be conical, tapered or curved in cross-section radial to the ring, or be a combination of such shapes, so long as they are adapted to receive a particular expansion ring to be positioned adjacent thereto complete the joint structure. The particular expansion ring 30 illustrated in FIGS. 1 to 3 is essentially rectangular in cross-section and thus ia adapted to fit inside of the cylindrical peripheral surfaces 20 and 21 in a snug relationship. The expansion ring can be made of any suitable metal having appropriate expansion properties to effect the desired seal.

Expansion ring 30 is hollow and the space thus provided functions as a path or channel 31 by which a cooling or heating fluid can be circulated in the interior of the expansion ring. Conduit 32 communicates with the interior of expansion ring 30 and with a hole 33 in the wall of vessel body 11. Expansion joint 27 is placed in conduit 32 to accommodate stresses induced by heating and cooling of the vessel and expansion ring. Conduit 34 is connected to hole 33 for supplying fluid thereto.

As shown in FIG. 2, a cooling or heating fluid can be supplied to the expansion ring 30 by conduit 36 through open valve 37, with valve 53 closed, to pump 38 which then forces it to conduits 34 and 39. Conduit 34 delivers the fluid to conduit 32 which feeds it into expansion ring 30. Similarly, conduit 39 feeds fluid to conduit 40 which then feeds it into the expansion ring at a position approximately opposite to inlet conduit 32. Fluid is removed from the expansion ring by conduit 41 which feeds the fluid to conduit 42. Similarly, conduit 43 simultaneously removes fluid from the expansion ring and delivers it to conduit 44. The removed fluid is then conveyed by conduits 42 and 44 to conduit 45 through open valve 46 to conduit 47, with valve 49 closed, for discharge or for recirculation after it has been suitably heated or cooled prior to reinjection into the expansion ring. It should be understood that only one conduit means need supply fluid to the expansion ring and only one conduit means need be used to remove fluid from it.

Also as shown in FIG. 2, the fluid can be circulated hot or cold in a closed loop. Thus, with valve 46 closed, the outlet stream of fluid can be sent from conduit 45 to conduit 48 through open valve 49 to conduit 50 and then to heat exchanger 51 from which the fluid exits to conduit 52 and is fed through open valve 53 to conduit 54 and from it, with valve 37 closed, to pump 38 for recirculation through the expansion ring. Heat exchanger 51 can be used to heat or cool the fluid to close or open the seal as required.

Any suitable hot or cold fluid, whether it be a gas or liquid, can be circulated through the expansion ring. Among the fluids which can be used are air, liquid nitrogen, water, methanol, ethylene glycol or kerosene.

To produce a joint according to the invention, expansion ring 30 is positioned in vessel body 11 to be close to peripheral surface 20. Cover 15 is then put in position with inner peripheral surface 21 close to the outer surface of expansion ring 30. Then the vessel and cover are coupled together by one or more C-clamps 17. Hot fluid is then circulated through the expansion ring as already described to cause the ring to thermally expand and thereby seal with the vessel and cover. In doing so, it forces sealing rings 60 and 61, located in grooves in the expansion ring, into extremely tight contact with the inner peripheral surfaces of the vessel body opening and the vessel cover. In this way, a tight joint structure can be achieved before the vessel is subjected to processing pressures and temperatures. In addition, the seal can be maintained tight by continuing to circulate a hot fluid through the expansion ring during processing operations. The expansion induced in the expansion ring in this way will thus continue to maintain a sealing arrangement even though the vessel body and cover enlarge because of the internal pressures and temperatures to which they are subjected. Furthermore, by making the expansion ring from a material having a coefficient of thermal expansion higher than that of the material used for the vessel body and vessel cover, an even greater potential expansion of the ring can be induced than of the adjacent peripheral surfaces of the vessel body and cover thereby further increasing the sealing action.

When it is desired to open the vessel, the vessel interior can be depressurized in a conventional manner and then a cool fluid circulated through the expansion ring before or after removing the C-clamps. This causes the ring to shrink or contract and thereby releases the seal and permits ready removal of the vessel cover.

The outer peripheral surface of the expansion ring is advisably machined so that an interference fit exists between it and the inner peripheral surfaces of the vessel opening and the recessed peripheral area of the vessel cover. The expansion ring must have sufficient cross-section and yield strength so that yielding does not occur during the vessel operation. Furthermore, the expansion ring must have sufficient flexibility to maintain seals 60 and 61 in contact with the vessel body and the cover to accommodate deformation of them under internal pressure.

Seals 60 and 61 can be made of any suitable metallic or non-metallic material or, alternatively, they may be formed as integral lips of the expansion ring.

Figure 4:
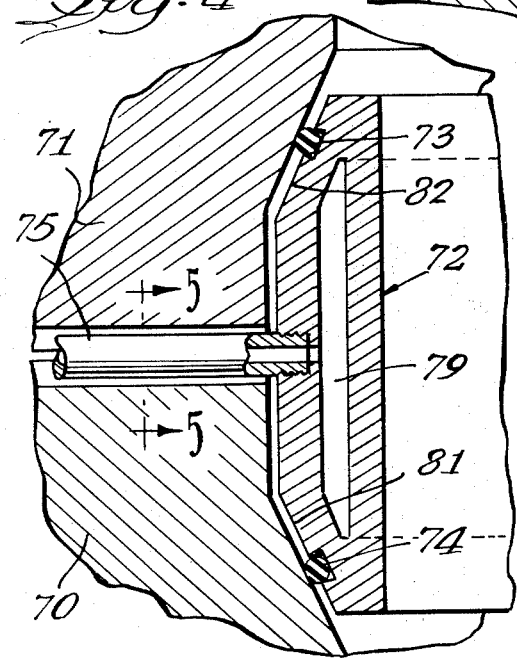
FIG. 4 is a vertical sectional view of a joint structure and hollow expansion ring according to the invention showing a conduit for circulating fluid to the expansion ring located between the end faces of a vessel body and a cover therefor.
Figure 5:
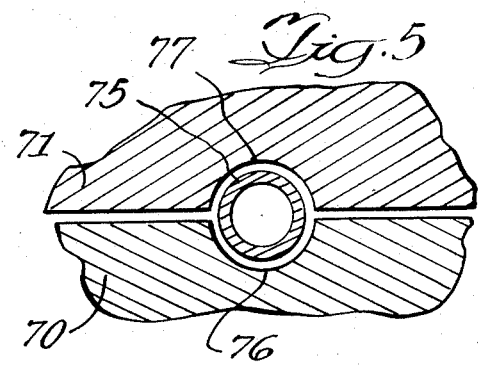
FIG. 5 is a sectional view taken along the line 5—5 of FIG. 4.

FIGS. 4 and 5 show a further embodiment of the invention. Vessel body 70 and cover 71 are positioned so that their end faces are in approximately abutting position. Expansion ring 72, which is internally hollow, is positioned inside of the vessel body and vessel cover so as to span the interface formed by the abutting end faces of the vessel body and vessel cover. O-ring seals 73 and 74 are positioned in grooves located in conical faces 81 and 82 provided on the outer peripheral edges of the expansion ring. Conduit 75 communicates with channel or path 79 in expansion ring 72 and is used to supply or remove cooling or heating fluid therefrom. Conduit 75 is located at the interface formed by the adjacent end faces of the vessel body 70 and the cover 71. Troughs 76 and 77 are cut in the end faces of the vessel body and vessel cover respectively to receive conduit 75 with clearance so that it can extend from the expansion ring to outside of the vessel. It should be understood that additional conduits like conduit 75 can be positioned in communication with the expansion ring to provide for adequate circulation of a heating or cooling fluid in the ring.

The combination expansion ring and conduit system shown in FIGS. 4 and 5 is considered preferable to that shown in FIGS. 1 to 3 because no holes need be provided in the vessel body or vessel cover to accommodate the conduit system.

While the invention is particularly useful in providing means to seal a cover to a vessel, it can also be used to seal two ends of cyindrical pipe or tubing together. Furthermore, when used on a vessel, the cover can be flat or domed so long as the cover contains a suitable sealing surface, such as provided by a cylindrical recess therein, for the expansion ring.

The foregoing detailed description has been given for clearness of understanding only, and no un-necessary limitations should be understood therefrom, as modifications will be obvious to those skilled in the art.

What is claimed is:

1. A joint structure comprising:
   a first member having an opening provided with an annular end face and an inner peripheral surface extending inwardly and angularly from the mouth of said opening;
   a second member having an annular end face and an inner peripheral surface extending angularly therefrom;
   said end faces having mutually mating configurations positioned opposite each other in close proximity and releasably secured together;
   a hollow thermally expandable metallic expansion ring having an outer peripheral surface which is in close proximity to the inner peripheral surfaces of the first and second members and spans the distance between the end faces thereof; and
   first and second conduit means communicating with the expansion ring interior for supplying to said ring interior a cooling or heating fluid and removing the same therefrom, whereby said expansion ring can be thermally expanded to effect a seal or contracted to break a seal by supplying a heating fluid or a cooling fluid to said ring interior.

2. A joint structure according to claim 1 in which the outer peripheral surface of the expansion ring has a sealing ring in contact with the inner peripheral surface of each member.

3. A joint structure according to claim 1 in which the conduit means comprises a first conduit for feeding a stream of cooling or heating fluid to the expansion ring, and a second conduit for removing the stream of cooling or heating fluid therefrom.

4. A joint structure according to claim 3 in which the first and second conduits extend through the first member or the second member.

5. A joint structure according to claim 3 in which the first and second conduits extend between the end faces of the first and second members.

6. A joint structure according to claim 1 in which the first and second members each have only one open end.

7. A joint structure comprising:
   a vessel having an opening defined by a rim with an inner peripheral surface extending inwardly from said opening;
   a cover, for the vessel opening, with a recess space therein having an inner peripheral surface;
   said vessel opening rim and cover having end faces with mutually mating configurations positioned opposite each other in close proximity and releasably secured together;
   a hollow thermally expandable metallic expansion ring having an outer peripheral surface which is in close proximity to the inner peripheral surfaces of the rim and cover and spans the distance between the end faces thereof; and
   first and second conduit means communicating with the expansion ring interior for supplying to said ring interior a cooling or heating fluid and removing the same therefrom, whereby said expansion ring can be thermally expanded to effect a seal or contracted to break a seal by supplying a heating fluid or a cooling fluid to said ring interior.

8. A joint structure comprising:
   a vessel having an open end with an inner peripheral surface;
   a domed cover, for the vessel opening, having a rim with an inner peripheral surface;
   said vessel open end and cover rim having end faces with mutually mating configurations positioned opposite each other in close proximity and releasably secured together;
   a hollow thermally expandable metallic expansion ring having an outer peripheral surface which is in close proximity to the inner peripheral surfaces of the vessel open end and the cover rim and spanning the distance between the end faces thereof; and
   first and second conduit means communicating with the expansion ring interior for supplying to said ring interior a cooling or heating fluid and removing the same therefrom, whereby said expansion ring can be thermally expanded to effect a seal or contracted to break a seal by supplying a heating fluid or a cooling fluid to said ring interior.

9. A hollow interior expansion ring having an outer peripheral surface with spaced apart sealing means thereon adapted to pressure seal with a peripheral joint of two members positioned therearound with the interface of the joint located between the spaced apart sealing means.

10. An expansion ring according to claim 9 having at least one conduit which communicates with the ring interior for supplying a circulating fluid thereto and another conduit which communicates with the ring interior for withdrawing a circulating fluid therefrom.

11. The method of joining and sealing a first member having an opening with an inner peripheral surface to a second member having an inner peripheral surface, the first and second members having end faces, with mutually mating configurations, positioned opposite each other in close proximity, which comprises:
   placing a hollow metal expansion ring having an outer peripheral surface in close proximity to the inner peripheral surfaces of the first and second members and spanning the distance between the end faces thereof;
   releasably securing the end faces of the two members together; and
   circulating a hot fluid through the expansion ring to cause it to expand into sealing engagement with the inner peripheral surfaces of the two members.

12. The method of claim 11 in which the outer peripheral surface of the expansion ring has a sealing ring in contact with the inner peripheral surface of each member.

* * * * *